United States Patent [19]

Forbes et al.

[11] Patent Number: 4,463,352

[45] Date of Patent: Jul. 31, 1984

[54] FAULT TOLERANT, SELF-POWERED DATA REPORTING SYSTEM

[75] Inventors: Ronald L. Forbes, McHenry County; Richard G. Winkler, Cook County, both of Ill.

[73] Assignee: Honeywell Inc., Minneapolis, Minn.

[21] Appl. No.: 395,361

[22] Filed: Jul. 6, 1982

[51] Int. Cl.³ .................. H04Q 9/00; G08B 19/00
[52] U.S. Cl. .................. 340/825.05; 340/825.36; 340/505
[58] Field of Search .................. 340/825.05, 825.54, 340/825.36, 505, 510, 511

[56] References Cited

U.S. PATENT DOCUMENTS

| | | |
|---|---|---|
| 3,387,266 | 6/1968 | Swartwout et al. . |
| 3,717,858 | 2/1973 | Hadden . |
| 3,732,562 | 5/1973 | Faber et al. . |
| 4,002,847 | 1/1977 | Dail . |
| 4,009,469 | 2/1977 | Boudreau et al. . |
| 4,139,737 | 2/1979 | Shimada et al. . |
| 4,311,986 | 1/1982 | Yee .................. 340/825.54 |
| 4,394,655 | 7/1983 | Wynne et al. .................. 340/825.36 |
| 4,413,250 | 11/1983 | Porter et al. .................. 340/825.54 |

Primary Examiner—Donald J. Yusko
Attorney, Agent, or Firm—Trevor B. Joike

[57] ABSTRACT

A fault tolerant, self-powered data gathering system is provided having a communication channel having at least three lines, a controller connected to the communication channel for receiving data messages from remote stations and for supplying power to the remote stations, the controller having a selector for selecting a pair of the three lines over which data messages can be received, the pair also supplying the power to the remote stations, and a plurality of remote stations connected to the communication channel, each remote station having a rectifier bridge connected to the three lines, the rectifier bridge accepting power of either polarity and bidirectional data flow, a power store connected to the rectifier bridge for storing power supplied by the controller, a data message apparatus for transmitting data messages to the controller, and a transmitter connected to the rectifier bridge and to the data message apparatus for transmitting the data messages over the communication channel to the controller.

32 Claims, 3 Drawing Figures

FAULT TOLERANT, SELF-POWERED DATA REPORTING SYSTEM

BACKGROUND OF THE INVENTION

The present invention relates to a data reporting system and, more particularly, to a data reporting system which can tolerate faults on the communication channel and wherein remote stations both provide data messages to a central controller and are powered by the central controller.

In order to economically bring multiple sensor inputs to a central location, it is desirable to use a distributed time division multiplexed bus that is run throughout a building structure and is common to all of the remote stations which are providing the inputs to the bus. This type of reporting system is much more economical than the older types of systems which required a separate pair of wires between the central location and each of the remote stations providing inputs to the central location. The labor involved in running separate pairs of wires between each remote station and the central location, even more than the cost of the materials involved, makes such dedicated wire systems very expensive. By providing a single common communication channel, for example a coaxial cable, between the central location and all of the remote stations such that all of the remote stations report back over the same communication channel, labor and materials can both be economized.

However, using a single communication channel between a central location and the remote stations has the disadvantage that the opening or shorting of the wires making up the communication channel will disable all remote stations on the communication channel unless some sort of corrective action is taken. Also, the remote stations received power either from the central controller over a separate pair of wires or received power locally requiring additional wiring apparatus.

SUMMARY OF THE INVENTION

The present invention can tolerate opens as well as shorts and eliminate additional power wiring by providing a fault tolerant, self-powered data gathering system comprising a communication channel having at least three lines, a controller connected to the communication channel for receiving data messages for remote stations and for supplying power to the remote stations, the controller having a selector for selecting a pair of the at least three lines over which the data messages can be received, the pair also supplying power to the remote stations, and at least one remote station having a rectifier bridge connected to the three lines for accepting a power supply of either polarity and bidirectional data flow, a power storing apparatus connected to the rectifier bridge for storing the power supplied by the controller, a data message apparatus for transmitting data messages to the controller, and a transmitter connected to the rectifier bridge and to the data message apparatus for transmitting the data messages over the communication channel to the controller.

The circuit can be made further fault tolerant by connecting the communication channel and the remote stations connected thereto in a loop configuration with the controller. Thus, if all three lines are opened or shorted at the same location, the controller can still communicate with all remote stations by transmitting in one direction to the remote stations on one side of the fault and then reversing direction and transmitting to the remote stations on the other side of the fault.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
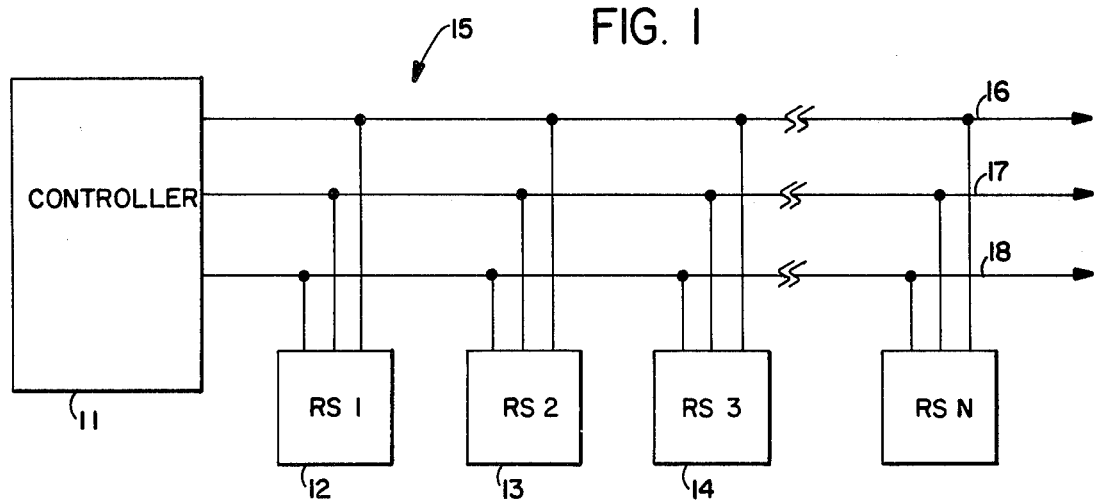
FIG. 1 shows a generalized block diagram of the system according to the present invention.

In FIG. 1, the data gathering system according to the present invention is shown having controller 11 which can receive messages from remote stations 12, 13, 14 and so on through the n remote station over communication channel 15 which is comprised of lines 16, 17 and 18. As will be discussed hereinafter, controller 11 together with the remote stations can be arranged for two-way communication so that controller 11 can poll the status of the remote stations and the remote stations can report back the status of the various alarm loops connected thereto.

As shown in FIG. 1, communication channel 15 is comprised of three lines so that an open in any line or a short between any two lines will not disable the system. Thus, for an open in line 16, for example, lines 17 and 18 can then be used by controller 11 for communicating with the remote stations. Similarly, for a short in lines 16 and 17, for example, line 18 together with either of the lines 16 or 17 can be used for communication with the remote stations. When the remote stations are to communicate with controller 11, the two selected lines are shorted together and opened in a sequence of data bits making up the data message.

Figure 2:
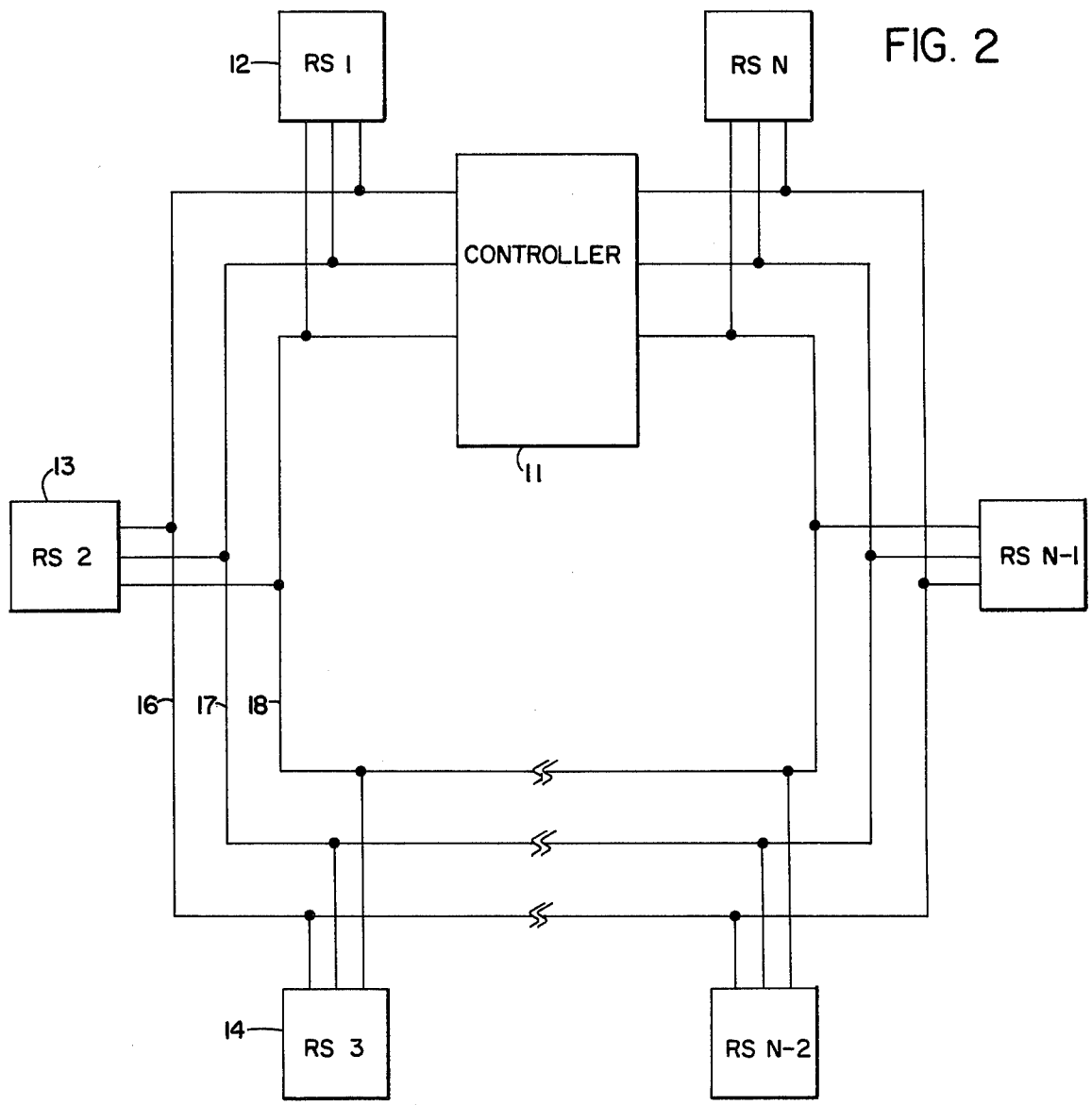
FIG. 2 shows the system of FIG. 1 connected in a loop configuration.

In FIG. 1, if all three lines are opened or shorted together at the same location, communication downstream of the fault will be terminated. However, if the remote stations are connected in a loop configuration as shown in FIG. 2, communication can be transmitted in a first direction by controller 11 to all remote stations on one side of the fault and then can be transmitted in the other direction to all remote stations on the other side of the fault.

Figure 3:
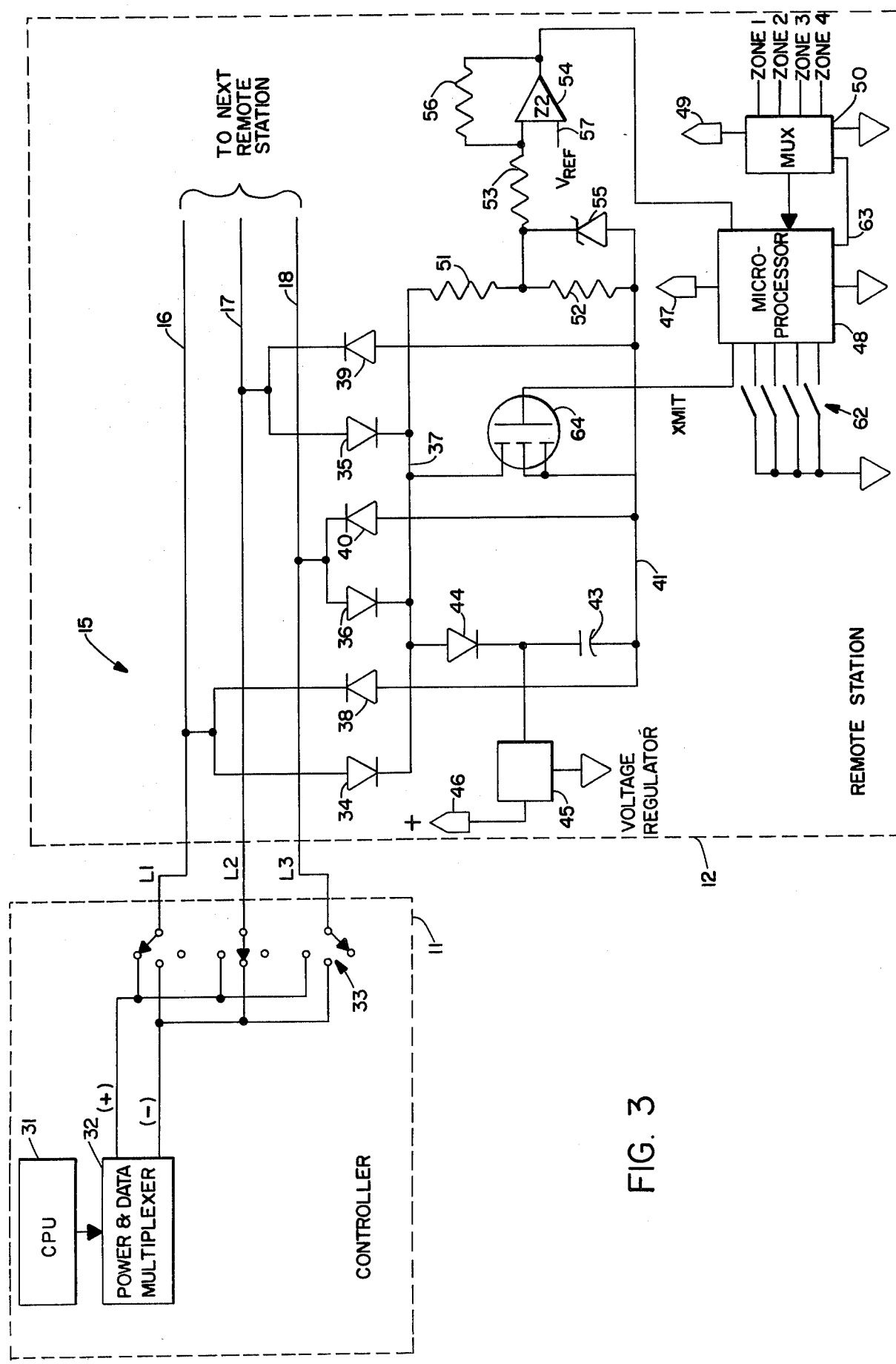
FIG. 3 shows the details of the controller and remote station used in the circuits of FIGS. 1 and 2.

FIG. 3 shows controller 11 and one of the remote stations, for example remote station 12, in more detail. Controller 11 is comprised of central processing unit 31 which communicates with the remote stations over communication channel 15. Central processing unit 31 communicates through power and data multiplexer 32 and through selector switch 33 with the remote stations. Power and data multiplexer 32 is designed to multiplex either data or power to communication channel 15 so that all the remote stations can be provided both with the communication signals generated by the central processing unit 31 and with power so that local power connections or sources for the remote stations or separate power wiring runs from the controller are not required. Selector switch 33 decides which two of the three lines making up communication channel 15 are to be connected to power and data multiplexer 32. Selector switch 33 also determines the polarity of the selected lines. Selector switch 33 can be controlled by the central processing unit 31 which can detect a failure in communication with a remote station, thus determining that there is a fault in the system, or selector switch 33 can be controlled manually dependent upon a visual indication given by the central processing unit 31 to a human operator.

Remote station 12 as shown is arranged to accept any polarity signal over any two of the three lines making up communication channel 15. Thus, diodes 34, 35 and 36 are connected in the forward direction from respective lines 16, 17 and 18 to common line 37. On the other hand, diodes 38, 39 and 40 are connected in the reverse direction from respective lines 16, 17 and 18 to common line 41. Thus, lines 37 and 41 act as the output nodes from the bridge consisting of diodes 34-36 and 38-40.

Because remote station 12, similar to the other remote stations, does not have a source of local power but must derive its power from controller 11, capacitor 43 is provided to store power at times when the selected pair of lines 16-18 are shorted and opened to form the bits of the binary data communication between the remote stations and controller 11. If it were not for capacitor 43, it can be seen that when lines 37 and 41 are shorted together during data communication, the remote station would not receive power. Thus, power is stored in capacitor 43 which is connected by diode 44 between lines 37 and 41. Diode 44 helps to insure that capacitor 43 will not discharge back through communication channel 15 when the selected pair of lines are shorted. Connected to capacitor 43 is voltage regulator 45 to supply regulated voltage to terminal 46 which is connected to corresponding terminals 47 for microprocessor 48 and 49 for multiplexer 50.

Since the system according to the preferred embodiment as shown herein is capable of two-way communication, incoming signals from controller 11 are supplied across resistors 51 and 52 and through resistor 53 to one input of amplifier 54. Zener diode 55 is connected across resistor 52 for limiting voltage swings to the input of amplifier 54. Resistor 56 is connected in a feedback configuration around amplifier 54 so that amplifier 54 will switch to square up the incoming signal. Thus, the output of amplifier 54 will have one value if the voltage signal through resistor 53 is above the reference established by input 57 and will have another value if the voltage connected to amplifier 54 through resistor 53 is below the reference to input 57. This reference voltage can be provided by, for example, a voltage divider supplied by terminal 46.

The output of amplifier 54 is connected to an input of microprocessor 48. Most signals received from controller 11 will be polling messages requiring the remote station to report the status of the alarm loops connected thereto. Thus, the message transmitted by controller 11 will have the address of the selected remote station. Microprocessor 48 will, therefore, compare the address as received from the output of amplifier 54 to its own address established by switch bank 62. If there is a match, microprocessor 48 will control multiplexer 50 over line 63 to supply it with the status of the four alarm loops, each loop connected to a specific zone as shown. When microprocessor 48 then has the status of all four zones as connected to it through multiplexer 50, it will begin transmitting the status of its four alarm loops using transistor 64 as a transmitter. Transistor 64 will be energized to short the selected pair of lines when one bit value is to be transmitted and is deenergized by microprocessor 48 to transmit the other bit value. Thus, for example, a one is transmitted when transistor 64 is energized and a zero is transmitted when transistor 64 is deenergized.

By use of the diode bridge consisting of diodes 34-36 and 38-40, remote station 12 can be connected to lines 16, 17 and 18 in any fashion and the installer does not have to concern himself with making sure the polarity is correct. Moreover, remote station 12 will then be immune to the direction of data flow and can receive power over communication channel 15 of either polarity for charging capacitor 43 for storing power during the times when transistor 64 is energized to transmit ones or when controller 11 pulls communication channel 15 down to transmit its ones. Thus, when power is being sent, capacitor 43 is charged through diode 44 for supplying voltage to regulator 45. When data is being sent, the data voltage is lower than the power voltage. However, capacitor 43 has stored power to be used by remote station 12 during such times. Diode 44 helps to isolate capacitor 43 from discharging back into communication channel 15 during such times.

The embodiments of the invention in which an exclusive property or right is claimed are defined as follows:

1. A fault tolerant, self-powered data gathering system comprising:
   communication means having at least three lines;
   controller means connected to said communication means for receiving data messages from remote stations and for supplying power to said remote stations, said controller means having selection means for selecting a pair of said at least three lines over which said data messages can be received, said pair also supplying said power to said remote stations; and,
   a plurality of remote stations connected to said communication means, each remote station comprising
   rectifier bridge means connected to said at least three lines, said rectifier bridge means accepting a power supply of either polarity and bidirectional data flow,
   power storage means connected to said rectifier bridge means for storing and power supplied by said controller means,
   data message means for transmitting data messages to said controller means, and
   transmitter means connected to said rectifier bridge means and to said data message means for transmitting said data messages over said communication means to said controller means.

2. The system of claim 1 wherein said communication means connects said plurality of remote stations to said controller means in a loop configuration.

3. The system of claim 2 wherein said power storage means comprises a capacitor connected by said rectifier bridge means to said communication means such that said capacitor will store said power supplied by said controller means.

4. The system of claim 3 wherein said transmitter means comprises a transistor connected by said rectifier bridge means between said selected pair for transmitting said data messages to said controller means.

5. The system of claim 4 wherein said data message means comprises a processor having first input means for gathering data to be transmitted as data messages to said controller means, second input means for providing an address associated with a remote station, a receive input for receiving addresses to be compared to the address of said second input means and a transmit output connected to said transistor for transmitting said data messages to said controller means when said address associated with said remote station matches said received address.

6. The system of claim 1 wherein said power storage means comprises a capacitor connected by said rectifier bridge means to said communication means such that said capacitor will store said power supplied by said controller means.

7. The system of claim 6 wherein said transmitter means comprises a transistor connected by said rectifier bridge means between said selected pair for transmitting said data messages to said controller means.

8. The system of claim 1 wherein said transmitter means comprises a transistor connected by said rectifier bridge means between said selected pair for transmitting said data messages to said controller means.

9. The system of claim 1 wherein said rectifier bridge means comprises first and second node lines, at least first, second and third diodes connected respectively in a forward direction from said three lines of said communication means to said first node line, and at least fourth, fifth and sixth diodes connected respectively in a reverse direction from said three lines of said communication means to said second node line.

10. The system of claim 9 wherein said communication means connects said plurality of remote stations to said controller means in a loop configuration.

11. The system of claim 2 wherein said power storage means comprises a capacitor and connecting means for connecting said capacitor between said first and second node lines and having an output for supplying power to said remote station.

12. The system of claim 11 wherein said transmitter means comprises a transistor having output terminals connected between said first and second node lines and a control terminal for receiving said data messages and for transmitting said data messages to said controller means.

13. The system of claim 12 wherein said data message means comprises a processor having first input means to receive the data to be transmitted to said controller means, second input means for providing an address associated with said remote station, a receive input for receiving addresses transmitted by said controller, said processor comparing said received address to said address established by said second input means, and a transmit output connected to said control terminal of said transistor for transmitting said data messages to said controller means when there is a match between said received message and said address established by said second input.

14. The system of claim 9 wherein said power storage means comprises a capacitor and connecting means for connecting said capacitor between said first and second node lines and having an output for supplying power to said remote station.

15. The system of claim 14 wherein said transmitter means comprises a transistor having output terminals connected between said first and second node lines and a control terminal for receiving said data messages and for transmitting said data messages to said controller means.

16. The system of claim 9 wherein said transmitter means comprises a transistor having output terminals connected between said first and second node lines and a control terminal for receiving said data messages and for transmitting said data messages to said controller means.

17. A fault tolerant, self-powered alarm transmission system comprising:
communication means having at least three lines;
controller means connected to said communication means for receiving alarm messages from remote stations and for supplying power to said remote stations, said controller means having selection means for selecting a pair of said at least three lines over which said alarm messages can be received, said pair also supplying power to said remote stations; and,
a plurality of remote stations connected to said communication means, each remote station comprising
rectifier bridge means connected to said at least three lines, said rectifier bridge means accepting a power supply of either polarity and bidirectional data flow,
power storage means connected to said rectifier bridge means for storing said power supplied by said controller means,
alarm message means having alarm sensors for transmitting alarm messages to said controller means, and
transmitter means connected to said rectifier bridge means and to said alarm message means for transmitting said alarm messages over said communication means to said controller means.

18. The system of claim 17 wherein said communication means connects said plurality of remote stations to said controller means in a loop configuration.

19. The system of claim 18 wherein said power storage means comprises a capacitor connected by said rectifier bridge means to said communication means such that said capacitor will store said power supplied by said controller means.

20. The system of claim 19 wherein said transmitter means comprises a transistor connected by said rectifier bridge means between said selected pair for transmitting said alarm messages to said controller means.

21. The system of claim 20 wherein said alarm message means comprises a processor having first input means for gathering alarm information to be transmitted as alarm messages to said controller means, second input means for providing an address associated with a remote station, a receive input for receiving addresses to be compared to the address of said second input means and a transmit output connected to said transistor for transmitting said alarm messages to said controller means when said address associated with said remote station matches said received address.

22. The system of claim 17 wherein said power storage means comprises a capacitor connected by said rectifier bridge means to said communication means such that said capacitor will store said power supplied by said controller means.

23. The system of claim 22 wherein said transmitter means comprises a transistor connected by said rectifier bridge means between said selected pair for transmitting said alarm messages to said controller means.

24. The system of claim 17 wherein said transmitter means comprises a transistor connected by said rectifier bridge means between said selected pair for transmitting said alarm messages to said controller means.

25. The system of claim 17 wherein said rectifier bridge means comprises first and second node lines, at least first, second and third diodes connected respectively in a forward direction from said three lines of said communication means to said first node line, and at least fourth, fifth and sixth diodes connected respectively in a reverse direction from said three lines of said communication means to said second node line.

26. The system of claim 25 wherein said communication means connects said plurality of remote stations to said controller means in a loop configuration.

27. The system of claim 18 wherein said power storage means comprises a capacitor and connecting means for connecting said capacitor between said first and second node lines and having an output for supplying power to said remote station.

28. The system of claim 27 wherein said transmitter means comprises a transistor having output terminals connected between said first and second node lines and a control terminal for receiving said alarm messages and for transmitting said alarm messages to said controller means.

29. The system of claim 28 wherein said alarm message means comprises a processor having first input means to receive alarm information to be transmitted to said controller means, second input means for providing an address associated with said remote station, a receive input for receiving addresses transmitted by said controller, said processor comparing said received address to said address established by said second input means, and a transmit output connected to said control terminal of said transistor for transmitting said alarm messages to said controller means when there is a match between said received message and said address established by said second input.

30. The system of claim 25 wherein said power storage means comprises a capacitor and connecting means for connecting said capacitor between said first and second node lines and having an output for supplying power to said remote station.

31. The system of claim 30 wherein said transmitter means comprises a transistor having output terminals connected between said first and second node lines and a control terminal for receiving said alarm messages and for transmitting said alarm messages to said controller means.

32. The system of claim 25 wherein said transmitter means comprises a transistor having ouput terminals connected between said first and second node lines and a control terminal for receiving said alarm messages and for transmitting said alarm messages to said controller means.

* * * * *